(12) United States Patent
Chu et al.

(10) Patent No.: US 8,381,631 B2
(45) Date of Patent: Feb. 26, 2013

(54) LAMINATE ARMOR AND RELATED METHODS

(75) Inventors: Henry S. Chu, Idaho Falls, ID (US); Thomas M. Lillo, Idaho Falls, ID (US); Thomas M. Zagula, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1109 days.

(21) Appl. No.: 12/325,510

(22) Filed: Dec. 1, 2008

(65) Prior Publication Data

US 2012/0180630 A1   Jul. 19, 2012

(51) Int. Cl.
   *F41H 5/04*   (2006.01)
   *B23K 20/04*   (2006.01)
   *B23K 20/14*   (2006.01)

(52) U.S. Cl. .......... 89/36.02; 89/911; 228/221

(58) Field of Classification Search ........ 89/36.02; 428/911; 29/33 R; 53/408; 72/363, 364, 72/365.2, 366.2; 228/221

See application file for complete search history.

(56) References Cited

U.S. PATENT DOCUMENTS

| | | | |
|---|---|---|---|
| 3,711,937 A | | 1/1973 | Emley |
| 3,858,428 A | * | 1/1975 | Thompson ............... 72/363 |
| 4,090,011 A | | 5/1978 | Barmkan et al. |
| 4,333,216 A | | 6/1982 | Slaughter |
| 4,706,361 A | | 11/1987 | Meyer et al. |
| 5,004,143 A | | 4/1991 | Nakasuji et al. |
| 5,087,319 A | * | 2/1992 | Held ............... 156/555 |
| 5,332,545 A | | 7/1994 | Love |
| 5,932,036 A | * | 8/1999 | Fukai ............... 148/670 |
| 5,980,602 A | * | 11/1999 | Carden ............... 75/236 |
| 6,232,573 B1 | * | 5/2001 | Fukai et al. ............... 219/121.14 |
| 6,284,014 B1 | * | 9/2001 | Carden ............... 75/252 |
| 6,357,332 B1 | * | 3/2002 | Vecchio ............... 89/36.02 |
| 7,077,306 B2 | | 7/2006 | Palicka et al. |
| 7,082,868 B2 | | 8/2006 | Reichman |
| 2001/0041148 A1 | * | 11/2001 | Oyama et al. ............... 420/420 |
| 2004/0115463 A1 | | 6/2004 | Sibum |
| 2004/0221929 A1 | * | 11/2004 | Hebda et al. ............... 148/670 |
| 2006/0032560 A1 | * | 2/2006 | Benedictus et al. ............... 148/552 |
| 2006/0113353 A1 | | 6/2006 | Zwickel et al. |
| 2011/0233057 A1 | * | 9/2011 | Abkowitz et al. ............... 204/298.13 |

OTHER PUBLICATIONS

Perkins, Roger A., et al., Processing and Ballistic Evaluation of Dual-Hardness Titanium Armor, AD-777 809, Prepared for Army Materials and Mechanics Research Center, Apr. 1974, NTIS, Springfield, VA.

INL Technologies, Protecting Our Soldiers, INL's Survivability Programs Provide Detection, Avoidance and Defeat of Ballistic and Explosive Threats to the Nation's Personnel, Vehicles and Critical Infrastructure Deployed Worldwide, 06-GA50691-02, (undated).

* cited by examiner

*Primary Examiner* — Bret Hayes

(74) *Attorney, Agent, or Firm* — TraskBritt

(57) ABSTRACT

Laminate armor and methods of manufacturing laminate armor. Specifically, laminate armor plates comprising a commercially pure titanium layer and a titanium alloy layer bonded to the commercially pure titanium outer layer are disclosed, wherein an average thickness of the titanium alloy inner layer is about four times an average thickness of the commercially pure titanium outer layer. In use, the titanium alloy layer is positioned facing an area to be protected. Additionally, roll-bonding methods for manufacturing laminate armor plates are disclosed.

9 Claims, 4 Drawing Sheets

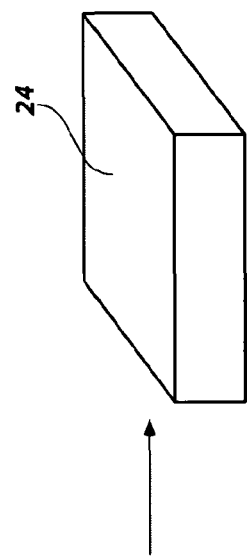
FIG. 4
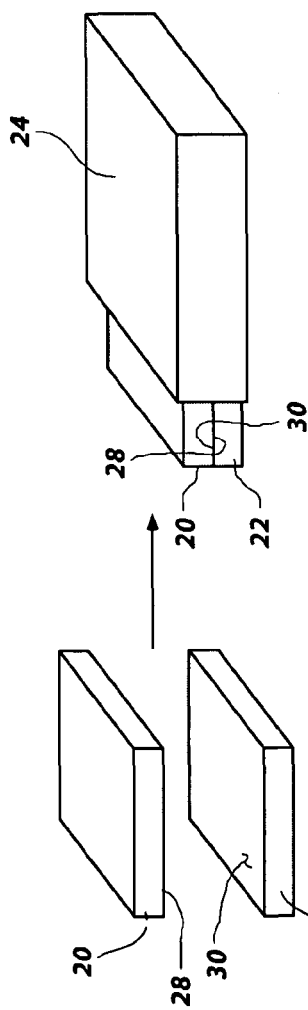
FIG. 5
FIG. 6
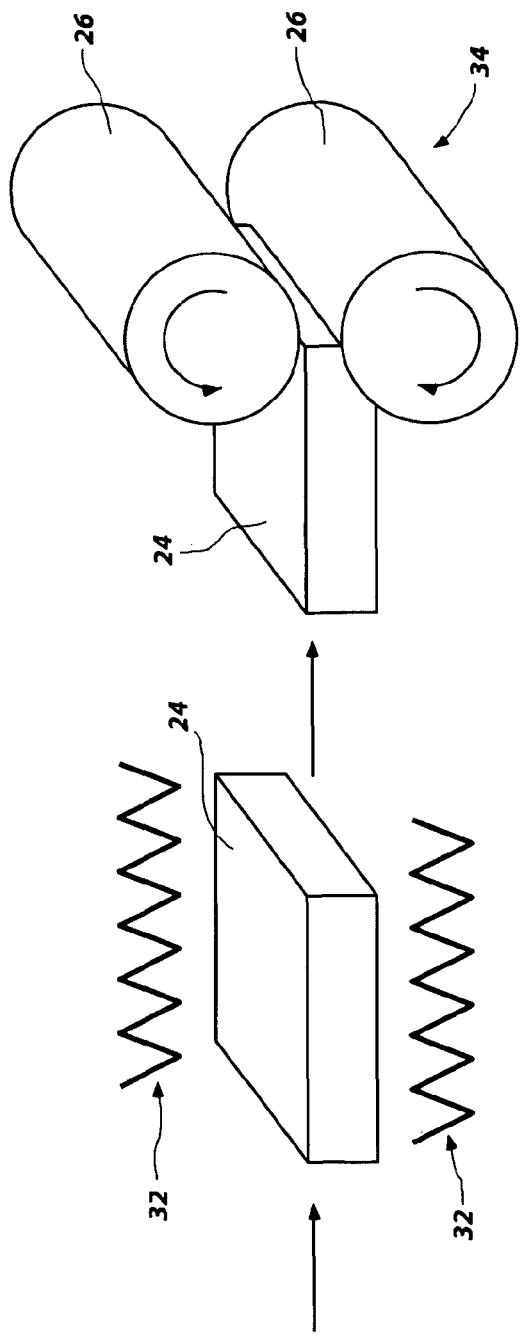
FIG. 7
FIG. 8

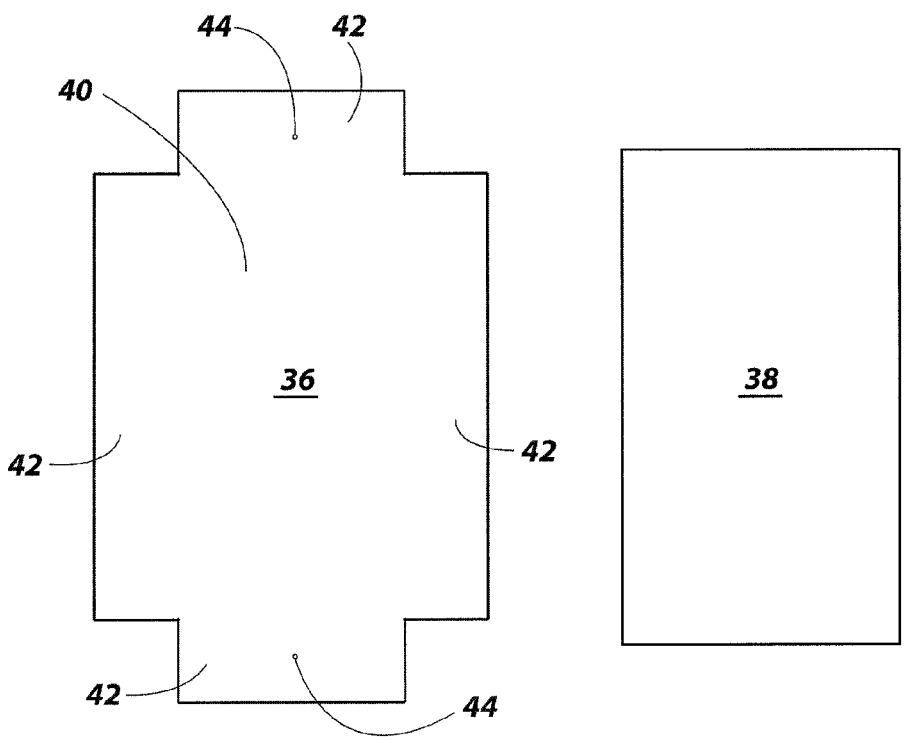
FIG. 11    FIG. 12
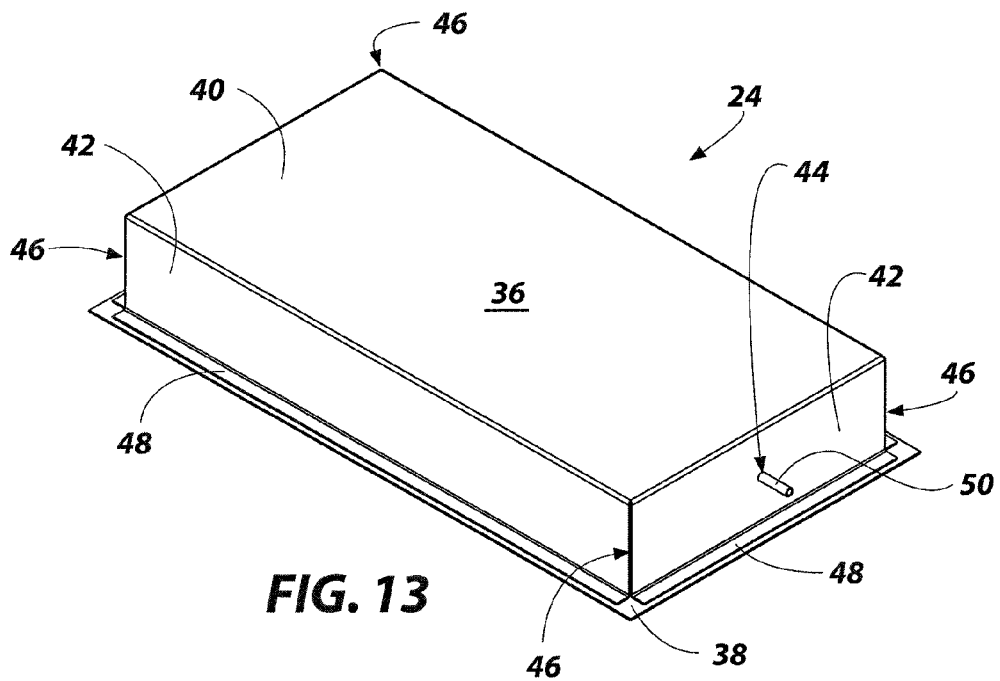
FIG. 13

LAMINATE ARMOR AND RELATED METHODS

GOVERNMENT RIGHTS

This invention was made with government support under Contract Number DE-AC07-05ID 14517 awarded by the United States Department of Energy. The government has certain rights in the invention.

TECHNICAL FIELD

The present invention, in various embodiments, relates to laminate armor and methods of manufacturing laminate armor. Specifically, the invention relates to laminate armor plates comprising a commercially pure titanium layer and a titanium alloy layer wherein, in use, the commercially pure titanium layer may be positioned toward a direction of potentially incoming, hostile projectiles. Additionally, the invention relates to manufacturing laminate armor plates using roll-bonding methods.

BACKGROUND

Titanium 6Al-4V alloy has been identified as the material of choice for lightweight combat and tactical vehicles because of its high mechanical strength, high hardness, low density, good formability and high ballistic performance. Research by the U.S. Army Research Lab, however, indicates that relatively thick monolithic titanium 6Al-4V plate suffers from adiabatic shear plugging failures.

In view of the above, it would be advantageous to provide improved titanium-type armor and improved methods of manufacturing titanium-type armor.

BRIEF SUMMARY OF THE INVENTION

In one embodiment, a method of manufacturing a laminate armor includes positioning a commercially pure titanium plate adjacent a titanium alloy plate in a stack and enclosing the stack within a container. A vacuum may then be formed in the container and the container may be heated. Finally, the commercially pure titanium plate and the titanium alloy plate may be roll-bonded together to form a titanium laminate armor plate by applying pressure to the container by passing the container through a rolling mill.

In another embodiment, a laminate armor may comprise a commercially pure titanium layer and a titanium alloy layer bonded to the commercially pure titanium layer. The average thickness of the titanium alloy layer of the laminate armor may be about four times the average thickness of the commercially pure titanium layer of the laminate armor.

In yet another embodiment, a protective structure includes a barrier that at least partially surrounds an area to be protected. The barrier may include at least one armor plate, each armor plate comprising a commercially pure titanium layer and a titanium alloy layer bonded to the commercially pure titanium layer. The average thickness of the titanium alloy layer of each armor plate may be about four times the average thickness of the commercially pure titanium layer of each armor plate. Additionally, the titanium alloy layer may be positioned toward the area to be protected and the commercially pure titanium layer may be positioned away from the area to be protected.

BRIEF DESCRIPTION OF THE DRAWINGS

FIGS. 4-8 show a process flow of a process according to an embodiment of the present invention for manufacturing an armor plate, such as shown in FIG. 1.

FIG. 11 shows a plan view of a top sheet for a container for use in manufacturing a laminate armor plate according to an embodiment of the present invention.

FIG. 12 shows a plan view of a bottom sheet for a container for use in manufacturing an armor plate according to an embodiment of the present invention.

FIG. 13 shows a perspective view of a container including the top sheet of FIG. 11 formed into a box and positioned over the assembly of FIGS. 9 and 10 and the bottom sheet of FIG. 12.

DETAILED DESCRIPTION

Figure 1:
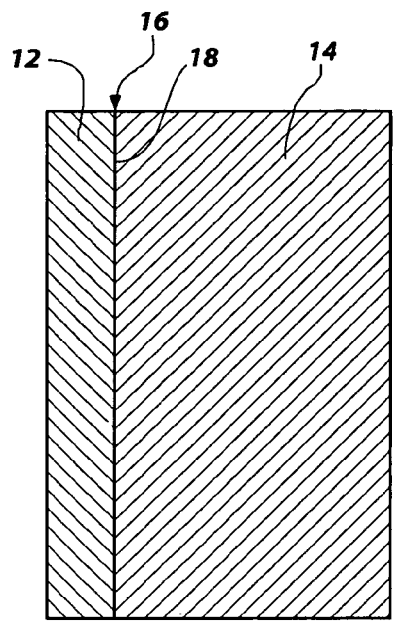
FIG. 1 shows a cross-sectional view of an armor plate according to an embodiment of the present invention.
Figure 2:
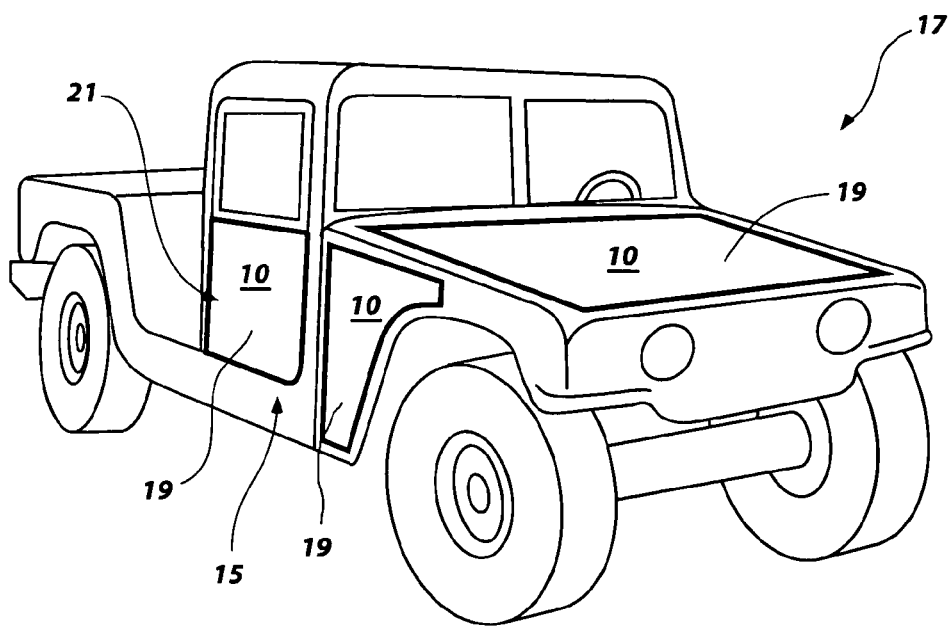
FIG. 2 shows a perspective view of a vehicle including armor plates, such as the armor plate shown in FIG. 1.

A cross-sectional view of an armor plate 10 according to an embodiment of the present invention is shown in FIG. 1. The armor plate 10 comprises a plurality of layers, including an outer layer 12 and an inner layer 14. The outer layer 12 may be positioned and configured to receive the initial impact from a projectile and the inner layer 14 may be positioned adjacent the outer layer 12 and may be contiguous with the outer layer 12. As used herein, the term "outer" is indicative of a relative position of layer 12 of armor plate 10 as placed in use to receive a projectile impact, while the term "inner" is indicative of a relative position of layer 14 of armor plate 10 as placed in use facing an area to be protected, for example, a volume containing personnel or material to be protected by armor comprising a laminate according to an embodiment of the present invention. For example, and as shown in FIG. 2, the armor plate 10 may be included in a protective structure, such as a vehicle 17, that includes a barrier 15 that at least partially surrounds an area to be protected, such as the interior of the vehicle 17, with the outer layer 12 of armor plate 10 positioned toward the outside of the vehicle 17 and the inner layer 14 of armor plate 10 being positioned toward the inside of the vehicle 17.

The outer layer 12 and inner layer 14 may be formed from material layers having different impedance, stiffness, or both, and the outer layer 12 may be formed from a material that is softer than the inner layer 14. For example, the outer layer 12 may be formed from a material having a lower modulus of elasticity than the material of the inner layer 14. As used herein, "impedance" is a measure of how much a structure resists motion when subjected to a given force at a given frequency. As used herein, "stiffness" is the resistance of an elastic body to deformation by an applied force.

Figure 3:
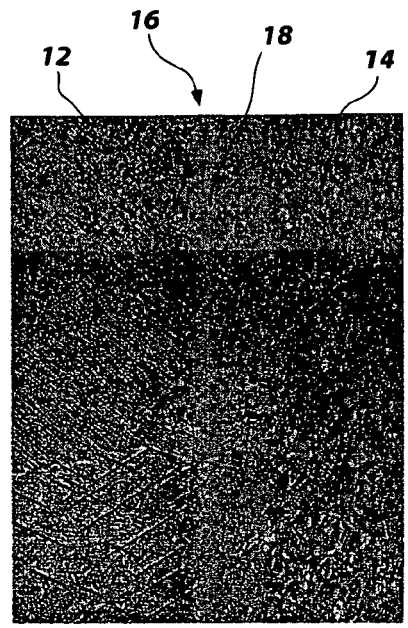
FIG. 3 shows a photograph of a magnified portion of an armor plate, such as the armor plate in FIG. 1, showing a bond interface between a commercially pure titanium layer and a titanium alloy layer.

In one embodiment, the outer layer 12 may be formed from commercially pure titanium (CP-Ti) and the inner layer 14 may be formed from a titanium alloy, such as titanium 6Al-4V (Ti-64), also known as "military-grade titanium." As used herein, the terms "Titanium 6Al-4V," "Ti-64," and "military-grade titanium" mean a titanium alloy consisting essentially of about 5.5% to about 6.75% aluminum, about 3.5% to about 4.5% vanadium and about 87.5% to about 91% titanium. The harder and stiffer Ti-64 inner layer 14 may be about four times the thickness of the softer CP-Ti outer layer 12. For example, the total thickness of the armor plate 10 may be about 30.5 mm, with the CP-Ti outer layer 12 being about 6.1 mm and the Ti-64 inner layer 14 being about 24.4 mm. The inner layer 14 and the outer layer 12 may be bonded together by an interlocking of the materials at an interface 16 (as shown in FIG. 3), such as by a weld 18 resulting from plastic deformation of the materials resulting from applied heat, pressure, or a combination thereof. Accordingly, the interface 16 between the inner layer 14 and the outer layer 12 may comprise intermingled material from the inner layer 14 and the outer layer 12 and may be substantially free of voids, as shown in FIG. 3.

The armor plate 10 may be a flat plate with substantially planar surfaces, such as shown in FIG. 1. However, in additional embodiments, the armor plate 10 may be stamped or otherwise formed into a shaped panel. For example, the armor plate 10 may be shaped as a vehicle panel 19, such as a vehicle door panel 21.

The inner layer 12 and outer layer 14 of the armor plate 10 may be bonded together by methods such as explosive welding, hot isostatic pressing (HIP), diffusion bonding, or a combination of such methods. However, new methods of roll-bonding titanium plates, according to embodiments of the present invention, may be utilized to form the armor plate 10 and may have several advantages over other bonding methods. For example, the bonding surface preparation may be relatively simple and without the requirement for using harsh chemicals, readily available commercial heating furnaces and rolling mill equipment may be used, and relatively high through-put may be achieved in comparison to explosive welding, HIP and diffusion bonding methods.

In one embodiment of the invention, a method of forming a titanium laminate armor 10 may comprise positioning a commercially pure titanium outer plate 20 adjacent a titanium alloy inner plate (FIG. 4 and FIGS. 9 and 10), such as a Ti-64 inner plate 22, enclosing respective outer and inner plates 20 and 22 in a container 24 (FIG. 5 and FIGS. 11-13), forming a vacuum within the container 24 (FIG. 6), heating the container 24 (FIG. 7), and roll-bonding respective outer and inner plates 20 and 22 together by applying pressure to the container 24 by passing the container through a rolling mill 34 (FIG. 8).

Figure 9:
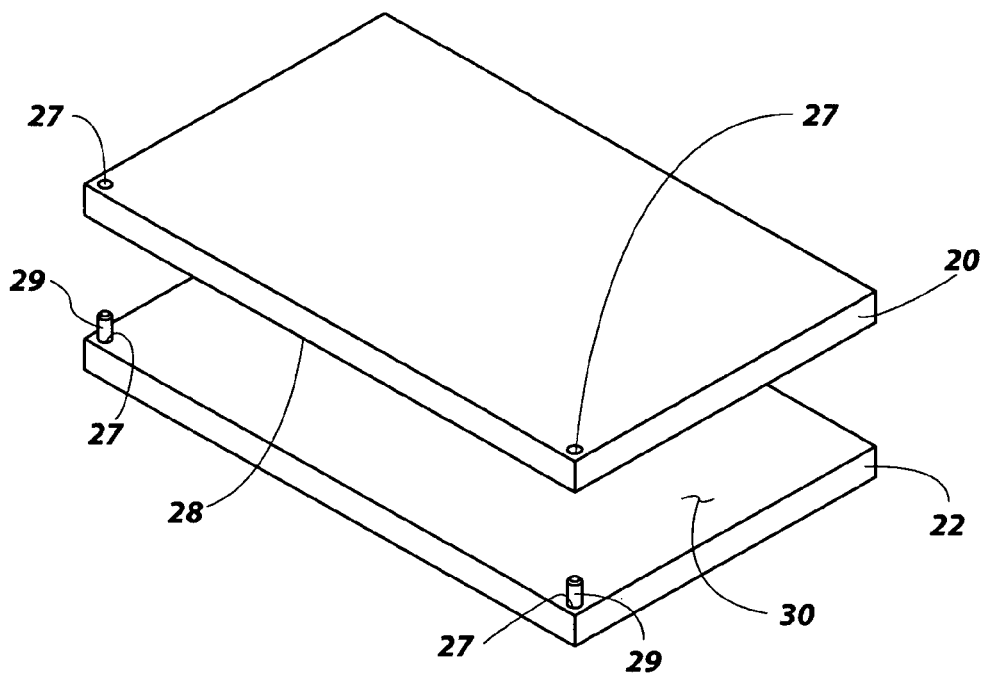
FIG. 9 shows a partially exploded pictorial view of an assembly including a commercially pure titanium plate and a titanium alloy plate for the manufacture of a laminate armor plate according to an embodiment of the present invention.
Figure 10:
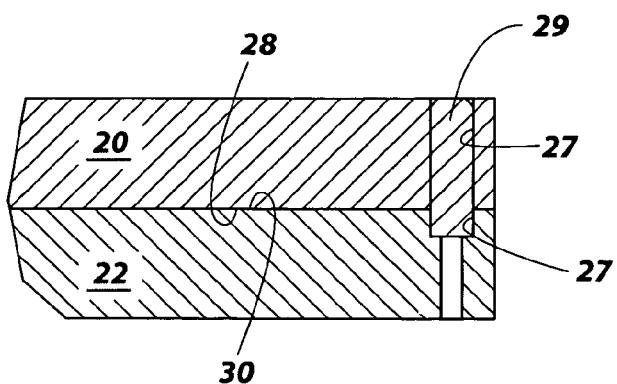
FIG. 10 shows a cross-sectional detail view of a portion of the assembly of FIG. 9, including a guide pin and guide holes.

As shown in FIG. 4 and FIGS. 9 and 10, CP Ti outer plate 20 and a Ti-64 inner plate 22 may each be formed at a desired initial thickness. For example, each plate 20 and 22 may be milled to a desired initial thickness. The initial thickness of each plate 20 and 22 may be greater than the desired final thickness, as the thickness of the outer and inner plates 20 and 22, respectively, may be reduced during the roll-bonding process. The softer CP-Ti outer plate 20 may be proportionally reduced in thickness more than the stiffer Ti-64 inner plate 22 during the roll-bonding process. Accordingly, the difference of the initial thickness of the outer and inner plates 20 and 22, respectively, may be less than the difference of the final thickness. For example, the CP-Ti outer plate 20 and the Ti-64 inner plate 22 may be machined to an initial thickness ratio of about 1:1.6 and after roll-bonding, and optional surface milling, the bonded CP-Ti outer layer 12 and a Ti-64 inner layer 14 (FIGS. 1 and 2) may have a final thickness ratio of about 1:4, with the Ti-64 inner layer 14 being the thicker layer.

Additionally, each plate 20 and 22 may be machined with guide holes 27 sized and configured to receive guide pins 29. For example, each plate 20 and 22 may include a guide hole 27 proximate each of two corners, and the guide holes 27 of the CP Ti outer plate 20 may be positioned to correspond to the guide holes 27 of the Ti 64 inner plate 22, as shown in FIGS. 9 and 10. The guide pins 29 may be formed from the same material as the CP-Ti outer plate 20. For example, the guide pins 29 may be formed from commercially pure titanium. The guide pins 29 may maintain the position of the CP-Ti outer plate 20 relative to the Ti-64 inner plate 22 during handling and during the manufacturing process.

After the CP-Ti outer plate 20 and the Ti-64 inner plate 22 have been formed to a desired initial thickness, and optionally prepared with guide holes 27 to receive guide pins 29, the bonding surfaces 28 and 30 may be cleaned to remove surface contaminants, such as oils and/or dirt. Many titanium bonding processes require that a relatively corrosive, strong acid, such as nitric acid ($HNO_3$) and/or hydrofluoric acid (HF), be used to prepare the bonding surfaces and remove the oxide layer that naturally forms on titanium. However, the inventors of the present invention have discovered that the use of strong acids are not required to form a suitable bond between the CP-Ti outer plate 20 and the Ti-64 inner plate 22 for forming the armor plate 10 when using roll-bonding methods according to the present invention. Instead, the bonding surfaces 28 and 30 of each of the CP-Ti outer plate 20 and the Ti-64 inner plate 22 may be prepared by milling, then cleaning with a standard industrial cleaner, such as the all-purpose cleaner distributed under the trade name Natural Orange by Trewax, Inc. of Garland, Tex., and a scouring pad followed by a degreasing with isopropyl alcohol.

After the bonding surfaces 28 and 30 of the CP-Ti outer plate 20 and the Ti-64 inner plate 22 have been milled, cleaned and degreased, guide pins 29 may be inserted into the guide holes 27 of the Ti-64 inner plate 22. Then the guide holes 27 of the CP-Ti outer plate 20 may be aligned with the guide pins 29 and the CP-Ti outer plate 20 may be stacked onto the Ti-64 inner plate 22 and the bonding surfaces 28 and 30 may be positioned adjacent one another.

A container 24 may be formed from a formable sheet material, such as steel sheet. For example, the container 24 may be comprised of steel sheet having a thickness of about 16 gauge to about 18 gauge (1/16 inch to 1/20 inch (1.59 mm to 1.27 mm)). The steel sheet may be formed as a generally rectangular box or envelope. In one embodiment, a steel sheet container may be formed by stacking two steel sheets.

As shown in FIGS. 11 and 12, a top sheet 36 (FIG. 11) and a bottom sheet 38 (FIG. 12) may be cut from one or more steel sheets. The top sheet 36 may be cut to include a top surface 40 and side surfaces 42, and two opposing side surfaces 42 may include a hole 44 formed therein. As shown in FIG. 13, the top sheet 36 may be bent and formed into an open box shape and welded at the corners 46 where the side surfaces 42 meet. Additionally, flanges 48 may extend from the side surfaces 42 of the box shape of the top sheet 36. Metal tubes 50 may be positioned over or through the holes 44 in the opposing side surfaces 42 and sealed to the side surfaces 42. For example, the metal tubes 50 may be welded to the side surfaces 42.

Next, the stacked CP-Ti outer plate 20 and Ti-64 inner plate 22 may be inserted into the container 24 as depicted in FIG. 5. For example, the stacked CP-Ti outer plate 20 and Ti-64 inner plate 22 may be positioned on the bottom sheet 38 and the top sheet 36, formed as a box, may be positioned over the stacked CP-Ti outer plate 20 and Ti-64 inner plate 22, as shown in FIG. 13. The edges of the bottom sheet 38 and the flanges 48 of the top sheet 36 may be bent and welded, or otherwise sealed. Accordingly, the container 24 may be substantially sealed and fluid communication to the inside of the container 24 may be limited to fluid communication through the metal tubes 50.

After the container 24 is sealed an inert gas, such as argon (Ar) or nitrogen (N$_2$), may be introduced into the container 24 through one of the tubes 50 and replace the air within the container 24, which may exit the container through the other tube 50 on the opposing side surface 42 of the top sheet 36. When substantially all of the air has been evacuated from the container 24 and replaced by inert gas the tube 50 that allowed the gas to escape the container may be plugged or otherwise sealed. Additional inert gas may then be introduced into the container 24, such that a positive pressure may be supplied within the container 24. A gas leak detector, such as the gas leak detector distributed under the trademark SNOOP® by Swagelok Company of Solon, Ohio, may be used to detect any significant leaks in the container 24, which may then be sealed after detection. After any repairs may be made and the container 24 may be made substantially fluid-tight, one tube 50 may be sealed, such as by crimping and welding, and a vacuum may be applied to the other tube 50. After the container 24 is evacuated by the vacuum the container 24 may be tested to determine that it has been sealed effectively. For example, if the container 24 holds a vacuum for about 30 seconds it may be determined to be sufficiently sealed. The tube 50 that was attached to the vacuum may then be sealed, such as by crimping and welding.

As shown in FIG. 7, the sealed and evacuated container 24 may then be preheated to a working temperature. For example, the sealed container 24 may be positioned within a commercial atmospheric rolling furnace 32 and heated for a period of one hour or more to an average temperature between about 900° C. and about 1000° C. In one embodiment, the container 24 may be fed through the rolling furnace 32 at a feed rate of between about 10 cm/min and 12 cm/min. After the container 24, and stacked CP-Ti outer plate 20 and Ti-64 inner plate 22 therein have been preheated in the rolling furnace 32, the container 24 may be inserted into a rolling mill 34, as shown in FIG. 8.

In further reference to FIG. 8, the container 24 may be inserted into the rolling mill 34 and the work rolls 26 of the rolling mill 34 may apply pressure to the container 24 and the stacked CP-Ti outer plate 20 and Ti-64 inner plate 22. The preheated, stacked CP-Ti outer plate 20 and Ti-64 inner plate 22 may be pressed together at relatively high pressures from the work rolls 26 of the rolling mill 34. Accordingly, the materials of bonding surfaces 28 and 30 of the CP-Ti outer plate 20 and the Ti-64 inner plate 22 may intermesh to form a weld 18 (FIG. 3) and become bonded together. The container 24 may be passed through the rolling mill 34 only once, or multiple times. The CP-Ti outer plate 20 and the Ti-64 inner plate 22 are passed through the rolling mill 34 the desired number of passes so that the CP-Ti outer plate 20 and the Ti-64 inner plate 22 are sufficiently bonded to form a multi-layer titanium armor plate, such as armor plate 10 shown in FIG. 1. In one embodiment, the container 24 may be passed through the rolling mill 34 multiple times, and each time the container 24 is passed through the rolling mill 34, the thickness of the CP-Ti outer plate 20 and the Ti-64 inner plate 22 may be reduced and the materials of bonding surfaces 28 and 30 may become more intermeshed. For example, the average combined thickness of the CP-Ti outer plate 20 and the Ti-64 inner plate 22 may be reduced by about 20% to about 30%.

After forming the titanium armor plate 10 the container 24 may be removed and the armor plate 10 may be machined to a desired final shape. The container 24 may be cut and mechanically separated or peeled from the armor plate 10, or the container 24 may be removed during a machining process. For example, the edges of the armor plate 10 and the container 24 may be cut with a bandsaw, and then the surfaces of the armor plate 10 may be milled to a desired thickness, which may remove the container 24. As the CP-Ti outer plate 20 is softer than the Ti-64 inner plate 22 the CP-Ti material may flow over the edges of the Ti-64 inner plate 22 and this overflow material may be removed. Further processing, such as one or more of stamping, machining, cutting, shaping and forming, may be performed to achieve the final desired dimension and shape of the armor plate 10.

Armor plates according to the present invention, such as armor plate 10 described with reference to FIG. 1, may provide improved protection over a monolithic armor plate. For example, a bi-layered, roll-bonded armor plate 10 having a CP-Ti outer layer 12 and a Ti-64 inner layer 14 was demonstrated to possess higher protection level against a 20 mm (850 grains) fragment-simulating-projectile (FSP) than a monolithic Ti-64 plate of the same thickness. Protective ballistic limit tests were successfully completed indicating the roll-bonded bi-layered titanium armor plate 10 had better performance than military-grade monolithic titanium alloy of the same thickness. This surprising improvement over monolithic titanium alloy armor plate may result from the softer outer layer 12 of the laminated armor plate 10 absorbing, disrupting or disbursing shockwave energy transferred from a projectile.

A shockwave is a pressure wave generated in a material as a projectile impacts the material. The shockwave may propagate through the material at the speed of sound in the material. For example, a shockwave may propagate through titanium at about 5,090 meters per second (11,386 miles per hour). A shockwave may travel through an armor plate material at a speed that greatly exceeds the speed of the projectile impacting the armor plate. For a monolithic titanium alloy armor plate, the shockwave resulting from a projectile impact may pre-shock the material proximate the point of impact. The shockwave may rapidly travel through the monolithic titanium alloy to the inner surface of the armor plate and the energy of the shockwave may result in relatively large quantities of micro-cracks or spall voids that may form and coalesce in the armor plate and pre-weaken the monolithic titanium alloy armor plate. Accordingly, as the projectile penetrates into the pre-weakened monolithic titanium alloy armor plate, following the generated shockwave, the pre-weakened armor plate may fail. For example, an adiabatic plugging failure may occur.

A laminated titanium plate, such as armor plate 10, according to an embodiment of the present invention, may reduce the energy imparted to the Ti-64 inner layer 14 of the armor plate 10 by a shockwave and improve the performance of the armor plate 10. When a projectile impacts the softer and more ductile outer layer, such as a CP-Ti outer layer 12, the shock pressure generated ahead of a penetrating projectile may be absorbed, dispersed and disrupted, and, so, effectively dissipated. For example, the softer CP-Ti outer layer 12 may deform to absorb and dissipate energy from the shockwave. Additionally, the difference in the mechanical impedances between CP-Ti outer layer 12 and Ti-64 inner layer 14 may also reduce the magnitude of shock pressure transmitted into the Ti-64 inner layer 14. Accordingly, the Ti-64 inner layer 14, which is normally harder and stronger than CP-Ti, may not be pre-shocked to a level where relatively large quantities of micro-cracks or spall voids are formed in the Ti-64 inner layer 14 material.

The following example of an embodiment of the present invention was prepared and tested and compared to test results for a monolithic Ti-64 armor plate of equivalent thickness:

A laminated armor plate was manufactured using a roll-bonding method and protective-ballistic-limit tests were performed. First, the surfaces of a Ti-64 plate and a CP-Ti plate were cleaned and then about 0.025 inches (0.635 mm) to about 0.100 inches (2.54 mm) of material was milled from the bonding surfaces of the Ti-64 plate and the CP-Ti plate. The Ti-64 plate was milled to a thickness of about 25 mm and the CP-Ti plate was milled to a thickness of about 16 mm. Guide holes were formed in the CP-Ti plate and the Ti-64 plate and the plates were then cleaned thoroughly with an all-purpose cleaner using SCOTCH-BRITE® brand scouring pads and followed by a final degreasing with isopropyl alcohol. After cleaning and degreasing, CP-Ti guide pins were inserted into the guide holes and the CP-Ti plate was stacked on top of the Ti-64 plate with a milled surface of the CP-Ti plate in contact with a milled surface of the Ti-64 plate. The stacked CP-Ti and Ti-64 plates were inserted into a pre-fabricated rectangular steel container formed from steel sheets having a thickness of about 16 gauge to about 18 gauge (1/16 inch to 1/20 inch (1.59 mm to 1.27 mm)). and the steel container was weld-sealed around the perimeter and air was evacuated through an exit tube by introduction of inert gas through a supply tube. The exit tube was then plugged and the container was pressurized with the inert gas and tested for leaks. After repairs were made to the container, the exit tube was crimped and welded. Then a vacuum was applied to the supply tube and a vacuum was formed in the container. After it was determined that the container held the vacuum for about 30 seconds, the supply tube was crimped and welded. Next, the steel container containing the stacked CP-Ti and Ti-64 plates was preheated to an average temperature of about 975° C. in a roller furnace at a feed rate of about 10.8 cm/min. The pre-heated steel container, containing the stacked CP-Ti and Ti-64 plates, was then fed directly into a rolling mill. The container was passed through the rolling mill three times and the stack was reduced to a final thickness of 30.5 mm—an overall reduction of about 26%.

The roll-bonded CP-Ti and Ti-64 laminate armor plate was then milled and re-surfaced to final test target configuration, in the form of a plurality of rectangular plates, each about 23 cm tall, 20 cm wide and 2.5 cm thick. The roll-bonded CP-Ti and Ti-64 laminate armor plate targets were then tested at the live-fire range at the Idaho National Laboratory using a 20 mm powder gun and 20 mm caliber (860 grains) steel fragment-simulating-projectiles (FSPs). The range of impact velocities was set between about 700 meters per second (m/sec) and about 1067 m/sec. The ballistic result revealed that, with the frontal impact face being the softer CP-Ti layer, the roll-bonded CP-Ti and Ti-64 laminate armor plate fabricated by the above-mentioned process had about 4%—to about 6% better ballistic performance in comparison to a monolithic Ti-64 armor plate of equivalent thickness.

While specific embodiments of the invention have been shown by way of example in the drawings and have been described in detail herein, the invention is not limited to the particular forms disclosed. Rather, the invention includes all modifications, equivalents, and alternatives falling within the scope of the invention as defined by the following appended claims and their legal equivalents.

The invention claimed is:

1. A method of manufacturing a laminate armor structure, the method comprising:
    positioning a commercially pure titanium plate in contact with a titanium alloy plate in a stack;
    enclosing the commercially pure titanium plate and the titanium alloy plate in a container and forming a vacuum within the container;
    heating the container; and
    roll-bonding the commercially pure titanium plate and the titanium alloy plate together to form a laminate comprising a commercially pure titanium layer and a titanium alloy layer by applying pressure to the container by passing the container through a rolling mill.

2. The method of claim 1, further comprising removing the container from the laminate after roll-bonding.

3. The method of claim 1, wherein heating the container comprises heating the container to an average temperature within the range of about 900° C. to about 1000° C.

4. The method of claim 3, wherein heating the container comprises heating the container to an average temperature of about 975° C.

5. The method of claim 3, wherein heating the container further comprises heating the container within a rolling furnace operating at a feed rate of between about 10 cm/min and 12 cm/min.

6. The method of claim 5, wherein heating the container further comprises heating the container to an average temperature of about 975° C. within a rolling furnace operating at a feed rate of about 10.8 cm/min.

7. The method of claim 1, further comprising reducing, during roll-bonding, an average combined thickness of the commercially pure titanium plate and the titanium alloy plate by about 20% to about 30%.

8. The method of claim 7, further comprising reducing an average thickness of the commercially pure titanium layer to a final average thickness of about one-fourth the final average thickness of the titanium alloy layer.

9. The method of claim 1, further comprising forming the container from one or more steel sheets.

* * * * *

UNITED STATES PATENT AND TRADEMARK OFFICE
CERTIFICATE OF CORRECTION

| | | |
|---|---|---|
| PATENT NO. | : 8,381,631 B2 | Page 1 of 1 |
| APPLICATION NO. | : 12/325510 | |
| DATED | : February 26, 2013 | |
| INVENTOR(S) | : Henry S. Chu et al. | |

It is certified that error appears in the above-identified patent and that said Letters Patent is hereby corrected as shown below:

On the title page:

In ITEM (75) Inventors: change "Thomas M. Zagula," to --Thomas A. Zagula,--

Signed and Sealed this
Eleventh Day of February, 2014

Michelle K. Lee
*Deputy Director of the United States Patent and Trademark Office*